United States Patent [19]
Kogure

[11] 3,884,254

[45] May 20, 1975

[54] REDUCING VALVE

[75] Inventor: Tsuneo Kogure, Kawasaki, Japan

[73] Assignee: Amada Company, Ltd., Isehara-shi, Japan

[22] Filed: Nov. 28, 1973

[21] Appl. No.: 419,810

[30] Foreign Application Priority Data
Nov. 30, 1972 Japan.............................. 47-119379

[52] U.S. Cl. ................. 137/102; 137/494; 137/116
[51] Int. Cl. .......................................... G05d 11/02
[58] Field of Search ........ 137/494, 102, 85, 505.14, 137/505.15, 82

[56] References Cited
UNITED STATES PATENTS
1,696,143  12/1928  Hinchman........................... 137/494
1,937,565  12/1933  Griffiths............................. 137/102

*Primary Examiner*—William R. Cline
*Assistant Examiner*—H. Jay Spiegel
*Attorney, Agent, or Firm*—Thompson, Birch, Gauthier & Samuels

[57] ABSTRACT

A proportional reducing valve is disclosed wherein an "entering" fluid flow is received through an inlet port in communication with a first valve bore containing a first reciprocal valve member. The first bore is connected through an intermediate passageway to a second parallel valve bore containing a second reciprocal valve member. The second valve bore is in communication with an outlet port through which fluid received from the first valve bore through said passageway exits from the valve housing as an "exiting" fluid flow. The second valve member includes a passageway which, depending on the position of the second valve member within the second cylinder, may communicate with a drainage passageway leading to a drain port. The valve members are biased by springs against a rocker arm supported on a fulcrum, the position of which is adjustable in relation to the axes of the first and second valve bores to provide a means of controlling the pressure of the exiting fluid flow in proportion to that of the entering fluid flow.

5 Claims, 2 Drawing Figures

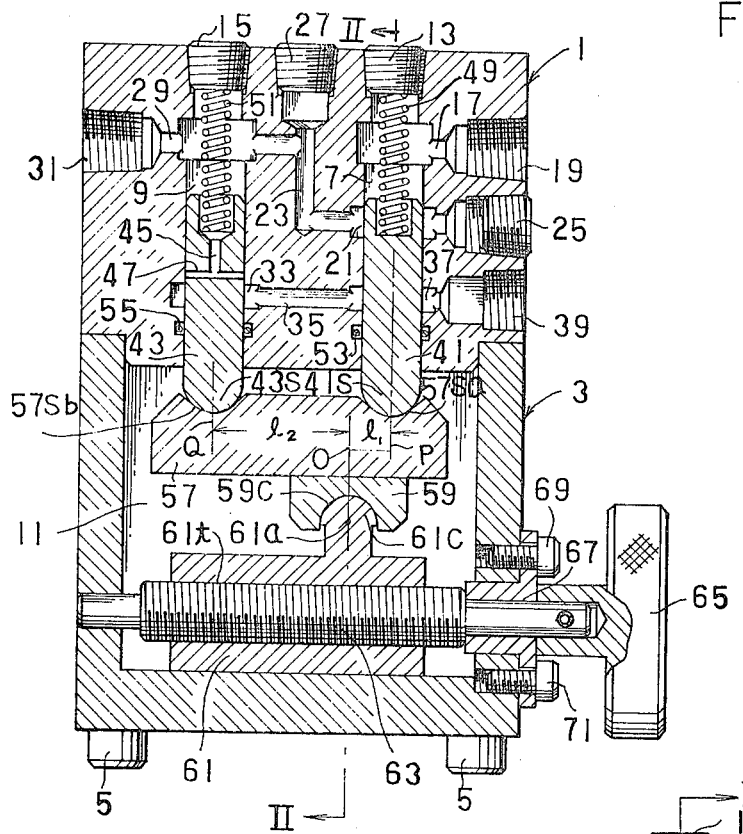

REDUCING VALVE

BACKGROUND OF THE INVENTION

1. Field of the Invention

The present invention relates generally to reducing valves for use in hydraulic or pneumatic circuits, and pertains in particular to a novel and improved proportional reducing valve which may be used in a hydraulic or pneumatic circuit to control the "secondary" pressure of a fluid exiting from the valve in proportion to the "primary" pressure of a fluid entering the valve.

2. Description of the Prior Art

Conventional reducing valves used in hydraulic or pneumatic circuits have been so designed that they will control the hydraulic or pneumatic fluid to a certain selected pressure only when the primary pressure deriving from the hydraulic or pneumatic source attains a certain selected value and that they will keep the secondary or controlled pressure always at a certain unchangeable value even when the primary pressure is changed. Heretofore, there has been no reducing valve that is capable of controlling the secondary pressure in proportion to the change of the primary pressure.

In practice, however, it is very often desirable to change or control the secondary pressure of the fluid for an actuator in an hydraulic or pneumatic circuit in proportion to the change of the primary pressure for another main actuator connected in the same circuit directly to the hydraulic or pneumatic source or pump. Also, it may be desirable to control or set steplessly or gradually the ratio in which the secondary pressure can be changed in proportion changes of the primary pressure.

SUMMARY OF THE INVENTION

It is an object of the present invention to provide a novel proportional reducing valve which is capable of controlling the secondary pressure of hydraulic or pneumatic fluid in a circuit in proportion to changes of the primary pressure in the same circuit.

It is another object of the present invention to provide a novel proportional reducing valve of the character described wherein the ratio in which the secondary pressure is to be changed in proportion to the change of the primary pressure can be easily and steplessly or gradually changed or adjusted.

It is a further object of the present invention to provide a novel proportional reducing valve which is of a compact and simple construction, and which is capable of automatically controlling the secondary pressure in proportion to the change of the primary pressure in any ratio.

Other and further objects and advantages will be apparent from the following detailed description, which, by way of illustration, shows a preferred embodiment of a proportional reducing valve embodying the concepts of the present invention.

BRIEF DESCRIPTION OF THE DRAWINGS

FIG. 1 is a longitudinal vertical section of a proportional reducing valve unit according to the present invention taken along the line 1—1 of FIG. 2.

FIG. 2 is a side elevation of the proportional reducing valve unit with a portion thereof shown in section as viewed on line II—II of FIG. 1.

DESCRIPTION OF THE PREFERRED EMBODIMENT

In the following description, the proportional reducing valve according to the present invention will be described as applied to a hydraulic circuit, since the valves according to the present invention are quite alike in construction and function whether employed in a hydraulic circuit or in a pneumatic circuit.

The proportional reducing valve unit according to the present invention comprises an upper valve block 1 and a lower casing 3. Functionally, the casing 3 could be an integral part of the valve block 1, but to allow for assembly, the casing 3 is made a separate part secured to the valve block 1 by any convenient means, for example the bolts 5 illustrated in the drawings. The valve block 1 is provided with two parallel vertical valve bores 7 and 9 which open to an interior chamber 11 formed in the casing 3. The valve bores 7 and 9 extend from the top of the valve block 1 only for the purpose of machining and their upper ends are closed by threaded plugs 13 and 15.

The upper portion of the valve bore 7 is connected through a passage 17 with a high pressure inlet 19 into which the hydraulic fluid under the primary pressure deriving from the hydraulic source or pump is supplied. The valve bore 7 is enlarged in diameter at a location beneath passage 17 to form a cylindrical chamber or cavity 21 which is connected through an intermediate passage 23 with the upper portion of the valve bore 9. As shown in FIG. 1, the useless bores which have been made while machining the passage 23 are closed by threaded plugs 25 and 27. Also, the enlarged portions provided at the upper ends of the valve bores 7 and 9 are functionally negligible as well.

The upper portion of the valve bore 9 is connected through a passage 29 with a low or secondary pressure outlet 31 through which the secondary or controlled pressure fluid is directed to an actuator. The valve bore 9 is enlarged in diameter at its lower portion to form a cylindrical chamber or cavity 33 which is connected through a passage 35 with another cylindrical chamber 37 formed at a lower portion of the valve bore 7. The cylindrical chamber 37 is connected with a drain port 39 through which surplus hydraulic fluid may be returned to a reservoir.

Slidably mounted in the valve bores 7 and 9 are valve members 41 and 43, respectively, which are provided with semispherical lower ends 41s and 43s projecting into the interior chamber 11 of the casing 3. The valve member 41 is so designed that its upper end will connect or disconnect the upper portion of the valve bore 7 with the cylindrical chamber 21 depending upon its vertical or axial location with regard to the valve bore 7. On the other hand, the valve member 43 is provided with an axial passage 45 passing from its upper end and communicating at its lower end with a transverse passage 47. Thus, the axial passage 45 connects the upper portion of the valve bore 9 with the transverse passage 47, while the transverse passage 47 is so designed as to be connected or disconnected with the cylindrical chamber 33 depending upon its vertical or axial location of the valve member 43 in the valve bore 9.

Compression springs 49 and 51 are provided between the upper ends of the valve members 41 and 43 and the undersides of the threaded plugs 13 and 15 so as to bias the valve members 41 and 43 downwardly. In order to prevent leakage of hydraulic fluid into the lower chamber 11, the valve bores 7 and 9 are provided with suitable seals 53 and 55.

The lower semispherical ends 41s and 43s of the valve members 41 and 43 are carried by a lever member 57 which is formed on its upper surface with semispherical depressions 57sa and 57sb for receiving the semispherical ends 41s and 43s respectively. The lever member 57 is supported by a rocker member 59 having at its bottom a horizontal semicylindrical depression 59c, and the rocker member 59 is pivotally supported by a carrier member 61 in a manner such that its downwardly facing semicylindrical concavity 59c is placed on a semicylindrical projection 61c formed on the top of the carrier member 61. The carrier member 61 is movably carried on the bottom of the interior chamber 11 of the casing 3. Thus, the lever member 57 is so designed as to be pivoted or rocked like a seesaw on the horizontal semicylindrical projection 61c of the carrier member 61, the latter having its axial center shown at 61a in FIG. 1. Accordingly, it now will be understood that the horizontal semicylindrical projection 61c of the carrier member 61 or strictly the axial center 61a of the same will act as a fulcrum for the lever member 57.

The carrier member 61 is provided through its longitudinal center with a threaded bore 61t within which a lead screw is threaded. The lead screw 63 is rotatably supported between the side walls of the interior chamber 11 of the casing 3 and is provided at its exposed end with a knob 65. In order to prevent axial movement of the lead screw 63, a bushing 67 is provided to hold the end portion of the lead screw 63 and is secured by screws 69 and 71. Thus, when the knob 65 is rotated, the carrier member 61 is moved on the bottom of the interior chamber 11 of the casing 3 rightwards or leftwards as viewed in FIG. 1, and accordingly the rocker member 59 is also moved in in either direction sliding on the underside of the level member 57. Also, the carrier member 61 is so designed that the perpendicular line "O" shown in FIG. 1 as passing through the axial center 61a of the semicylindrical projection 61c will be moved between the axial center line P of the valve member 7 and the axicial center line Q of the valve member 9.

Thus, it will be apparent that the axial center 61a of the horizontal semicylindrical projection 61c acting as the fulcrum of the level member 57 can be easily moved in either horizontal direction as viewed in FIG. 1 to change the distances $L_1$ and $L_2$ shown in FIG. 1 between the perpendicular line O through the axial center 61a and the axial center lines P and Q of the valve members 7 and 9, respectively. Stated alternatively, the leverage or lever ratio of the lever member 57 can be readily changed.

The operation of the proportional reducing valve of the present invention will now be described on the assumption that the valve unit has been filled with a hydraulic fluid without pressure.

When the hydraulic fluid under the primary pressure is firstly supplied from the hydraulic source or pump through the inlet 19 and the passage 17, the downward pressure fluid in the valve bore 7 will exert a downward force upon the top of the valve member 41, thus lowering the valve member 41 to connect the upper portion of the valve bore 7 with cylindrical chamber 21. Accordingly, the hydraulic fluid will be directed from the cylindrical chamber 21 through the passage 23 toward the valve bore 9. As will be apparent as the description proceeds, the hydraulic fluid in the valve bore 7 is of the primary pressure ($P_1$), and when passing between the wall of the valve bore 7 and the upper end of the valve member 41 into the cylindrical chamber 21, the hydraulic fluid is reduced in pressure to a secondary pressure ($P_2$). The secondary pressure fluid in the valve bore 9 is directed through passage 29 and the outlet 31 toward the actuator and at the same time it exerts a downward force upon the top of the valve member 9.

As understood by those skilled in the art, the hydraulic fluid having the secondary pressure in the valve bore 9 displaces the valve member 9 downward depending upon the position of the carrier member 61 with regard to the lever member 57, namely the distances $L_1$ and $L_2$ shown in FIG. 1 and the value of the primary pressure $P_1$ acting upon the top of the valve member 41 in the valve bore 7, since the valve members 41 and 43 are slidably supported by the lever member 57 having at its fulcrum the horizontal semicylindrical projection 61c of the carrier member 61 which can be moved to change the distances $L_1$ and $L_2$.

Stated more particularly, the action of the fluid pressure upon the valve members 41 and 43 and the lever member 57 can be mathematically described by the leverage formula: $L_1/L_2 = P_2/P_1$. When the secondary pressure $P_2$ is lower than the value of $L_1/L_2 \times P_1$, or $P_2 < L_1/L_2 \times P_1$, the hydraulic fluid in the valve bore 9 could not displace the valve member 43 downwards and on the contrary the valve member 43 is raised upwards, since the valve member 41 displaced by the primary pressure $P_1$ in the valve bore 7 pushes downwardly on the right-hand end or the concavity 57sa of the lever member 57 to swing the left-hand end of the same up. When the secondary pressure $P_2$ in the valve bore 9 is equal to $L_1/L_2 \times P_1$, or $P_2 = L_1/L_2 \times P_1$, the valve member 43 is in a state of equilibrium with the valve member 41 as shown in FIG. 1. Only when the secondary pressure $P_2$ is higher than $L_1/L_2 \times P_1$, or $P_2 > L_1/L_2 \times P_1$, the secondary pressure fluid in the valve bore 9 will displace the valve member 43 downwards lower than the state shown in FIG. 1.

When the secondary pressure $P_2$ in the valve bore 9 is larger than $L_1/L_2 \times P_1$ and displaces the valve member 43 downwards, the radial passage 47 of the valve member 43 is brought into connection with the cylindrical chamber 33 and simultaneously the valve member 41 is displaced by the lever member 57 to reduce or close the opening between the upper portion of the valve bore 7 and the cylindrical chamber 21. Accordingly, the hydraulic fluid in the valve bore 9 will partially flow into the cylindrical chamber 33 through the axial and transverse passages 45 and 47 of the valve member 43 to be drained through the passage 35 and the cylindrical chamber 37 out through the drain port 39, and simultaneously the fluid in the valve bore 7 is prevented partially or stopped completely from flowing into the cylindrical chamber 21 and as the result the secondary pressure of the hydraulic fluid directed through the outlet 31 to the actuator is reduced.

In case the secondary pressure $P_2$ in the valve bore 9 is reduced too much and becomes lower than the value of $L_1/L_2 \times P_1$, the valve member 41 is displaced downward by the primary pressure $P_1$ in the valve bore 7 and simultaneously raises the valve member 43 by means of the lever member 57. Accordingly, the valve bore 7 is connected with the cylindrical chamber 21 or the opening between the valve bore 7 and the cylindrical chamber 21 is made larger so that the hydraulic fluid or a larger quantity of the fluid may flow therethrough, while the opening between the radial passage 47 and the cylindrical chamber 33 is reduced or closed to prevent partially or completely the hydraulic fluid in the valve bore 9 from draining therethrough towards the drain port 39. As the result, the hydraulic fluid in the passage 23, the valve bore 9 and the passage 29 tends to be increased in quantity and accordingly the secondary pressure is increased.

As is thus apparent to those skilled in the art, the secondary pressure $P_2$ of the hydraulic fluid directed to the actuator through the outlet 31 is always kept equal to $L_1/L_2 \times P_1$, and this is expressed by the formula: $P_2 = L_1/L_2 \times P_1$. Accordingly, the secondary pressure $P_2$ is always changed in proportion to the change of the primary pressure $P_1$. Also, the proportional ratio namely $L_1/L_2$ in which the secondary pressure $P_2$ is in proportion to the primary pressure $P_1$ is determined by the distances $L_1$ and $L_2$ between the perpendicular line O and the axial center lines P and Q shown in FIG. 1, and this can be gradually changed or adjusted by rotating the knob 65 to change the position of the carrier member 61 with regard to the lever member 57.

As has been described, the proportional reducing valve according to the present invention is so designed that the secondary pressure is always in proportion to the primary pressure and the ratio of the proportion can be easily and gradually changed. Also, the proportional reducing valve of the present invention is of a compact and simple construction, and it works automatically to keep the secondary pressure in proportion to the primary pressure at any desired proportional ratio.

Although a preferred form of the present invention has been illustrated and described, it should be understood that the device is capable of modification by one skilled in the art without departing from the principles of the invention. Accordingly, the scope of the invention is to be limited only by the claims appended hereto.

I claim:

1. A proportional reducing valve comprising: a housing having first and second parallel bores, each being closed at one end and in communication at the opposite end with a housing chamber, said first bore also being in communication with an inlet in the housing wall for receiving hydraulic fluid at a primary pressure; first intermediate passageway means connecting said first bore to said second bore, said second bore also being in communication with an outlet in the housing wall through which hydraulic fluid at a secondary pressure may exit; second intermediate passageway means for connecting said second bore to a drain outlet in the housing wall; valve means for controlling fluid flow through said first and second passageway means; said valve means including first and second valve members reciprocally contained respectively in said first and second bores; a lever member mounted in said chamber for pivotal movement about a pivot point which lies on a reference line located between and parallel to the axes of said parallel bores; and resilient means in said bores for urging said valve members into contact with said lever member, whereupon pivotal movement of said lever member in response to axial movement of said first valve member as a result of force exerted thereon by the primary fluid pressure will produce opposite axial movement of said second valve member and a proportional adjustment of the secondary fluid pressure.

2. The apparatus as claimed in claim 1 further characterized by means for adjusting the position of said pivot point in relation to the axes of said bores.

3. The apparatus as claimed in claim 2 wherein the means for adjusting the position of said pivot point comprises a rocker member supporting and in slidable contact with said lever member, said rocker member having a semicylindrical depression into which is received a semicylindrical projection on a carrier member slidably contained in said chamber, and adjustment means for slidably adjusting said carrier member in a direction transverse to the axes of said bores.

4. The apparatus as claimed in claim 3 wherein each of said valve members has a semispherical end which protrudes into said chamber and which is received in a semispherical depression in said lever member.

5. The apparatus as claimed in claim 3 wherein said adjustment means includes a threaded bore in said carrier member, screw means journalled for rotation in said housing, said screw means being threaded through said bore and having one end protruding through said housing wall for external manipulation by knob means connected thereto.

* * * * *